Aug. 1, 1961  S. WILLIAMS  2,994,175
DOUBLE SICKLE CUTTING ASSEMBLY
Filed Dec. 29, 1958  2 Sheets-Sheet 1

Sandusky Williams
INVENTOR.

BY Clarence A. O'Brien
and Harvey B. Jacobson
Attorneys

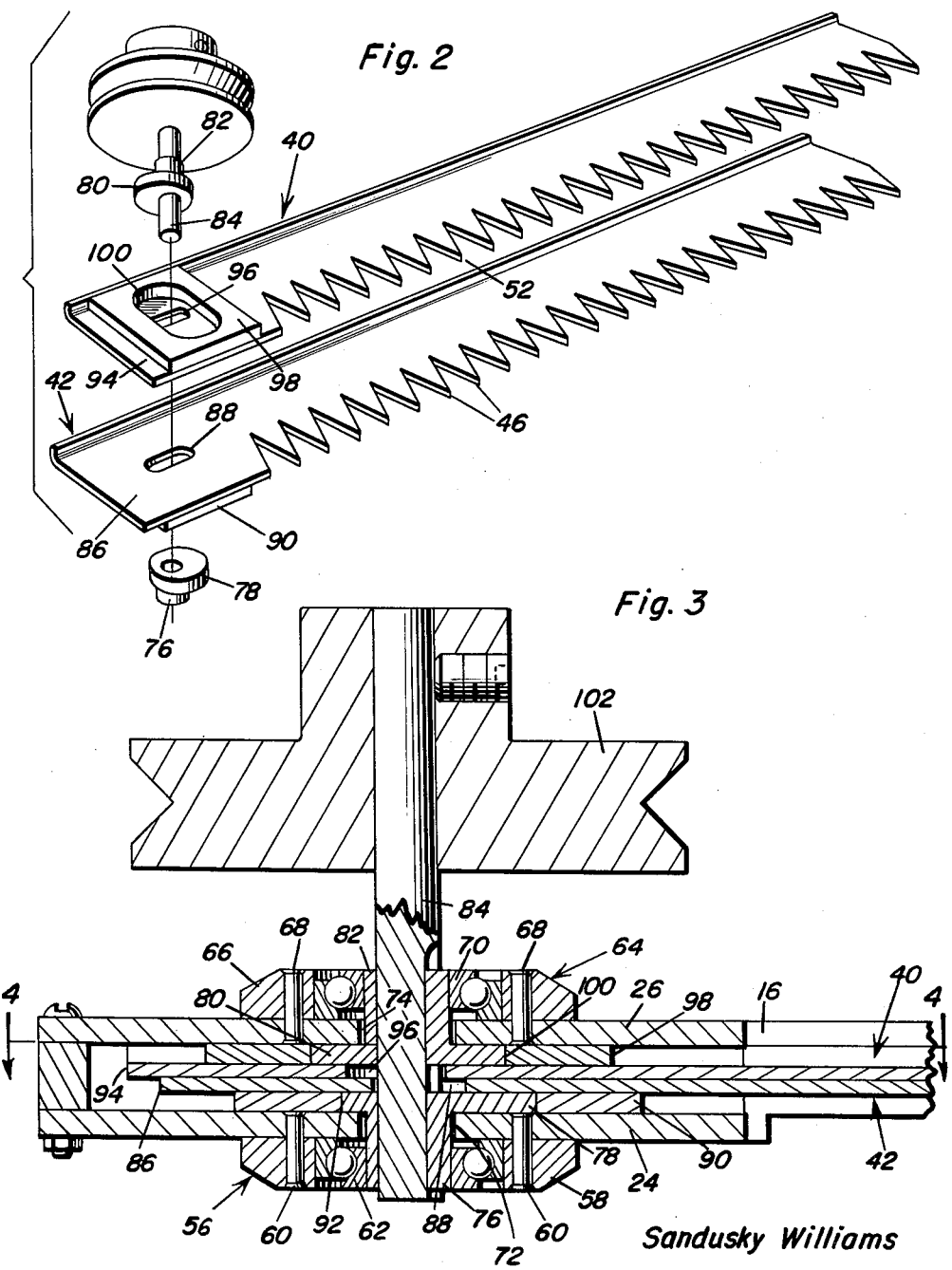

2,994,175
DOUBLE SICKLE CUTTING ASSEMBLY
Sandusky Williams, 1159 St. Louis St., Springfield, Mo.
Filed Dec. 29, 1958, Ser. No. 783,216
3 Claims. (Cl. 56—297)

This invention relates in general to new and useful improvements in mowing machines, and more specifically to improvements in the blades of a mower.

This invention relates primarily to that type of mower wherein both blades reciprocate in timed out of phase relation. The blades are driven by means of an eccentric so that a single shaft will operate the blades. It is the primary object of this invention to provide an improved mounting for the blades which is of an extremely simple construction and which at the same time requires very little care.

Another object of this invention is to provide an improved blade assembly for mowers of the type which include two blades reciprocating in timed out of phase relation, the blade assembly including a pair of blades which are disposed in overlying relation and which have disposed along the rear edges thereof upturned rear flanges, the rear flanges of the two blades being disposed in contacting and sliding engagement with each other with the two blades being disposed in nested relation and so mounted within a housing whereby the blades are retained in this relation as they reciprocate relative to each other.

Another object of this invention is to provide a blade mounting for mowers of the type having a pair of reciprocating blades the blade mounting including a housing having a generally L-shaped cross-sectional recess therein for receiving blades, the blades being disposed in nested relation and having upstanding rear flanges with the rear portions of the blades being seated in the L-shaped recess of the housing and so positioned for reciprocatory movement.

A further object of this invention is to provide an improved blade mounting for reciprocating mowers having a pair of reciprocating blades, the mounting including an elongated housing which is formed of a plurality of plates suitably secured together to define generally an L-shaped cross-sectional recess which opens through the forward edge of the housing and which has seated therein the rear portion of the blades of the mower, the blades of the mower being disposed in overlying relation and having upstanding rear flanges which are disposed in face abutting relation so that the blades are internested, the blades being seated in the L-shaped cross-sectional recess and guided by the housing during their reciprocatory movement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an exploded perspective view of the blades and the means for driving the blades, the ends of the blades being omitted;

FIGURE 3 is an enlarged fragmentary sectional view taken substantially upon the plane indicated by the section line 3—3 of FIGURE 1 and shows further the details of the means for driving the blades;

Figure 1:
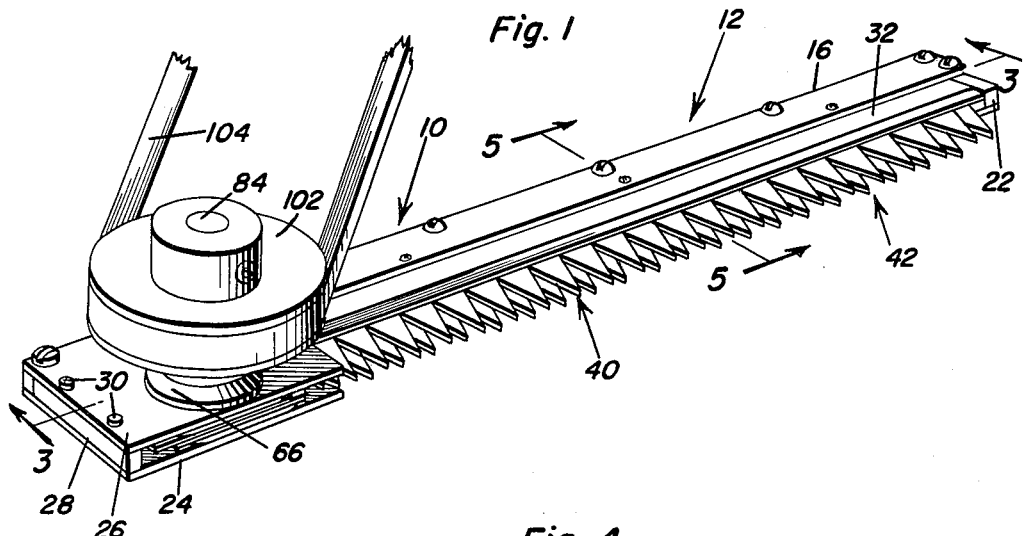
FIGURE 1 is a perspective view of a mower assembly incorporating the blade structure which is the subject of this invention, the details of supports for the mower assembly being omitted for purposes of clarity.
Figure 4:
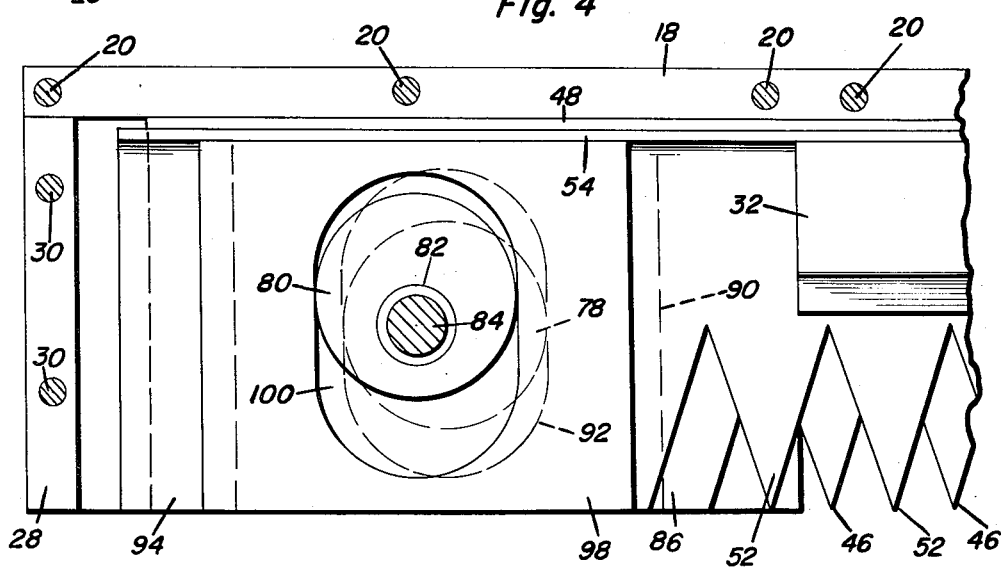
Figure 5:
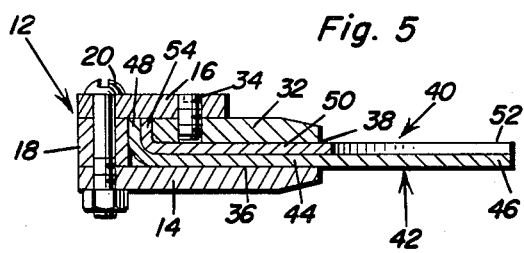

FIGURE 4 is a fragmentary horizontal sectional view taken substantially upon the plane indicated by the section line 4—4 of FIGURE 3 and shows further the details of the means for mounting and driving the blades; and FIGURE 5 is an enlarged transverse sectional view taken substantially upon the plane indicated by the section line 5—5 of FIGURE 1 and shows the specific details of the construction of the housing of the mower and the manner in which the blades are mounted therein.

Referring now to the drawings in detail, it will be seen that there is illustrated in FIGURE 1 the mower assembly which is the subject of this invention, the mower assembly being referred to in general by the reference numeral 10. The mower assembly 10 includes a housing which is referred to in general by the reference numeral 12. The housing 12 is the backbone for the mower 10 and will be supported in any suitable manner.

The housing 12 is formed of a bottom plate 14 and a top plate 16 which are disposed in vertically spaced relation and which are separated at their rear edges by a filler bar 18. The plates 14 and 16 are connected together by fasteners 20 passing through the rear portions of the plates 14 and 16 and through the filler bar 18. It is to be noted that the top plate 16 is of a much lesser width than the bottom plate 14. This is clearly illustrated in FIGURE 5. At the right end of the housing 12, as viewed in FIGURE 1, the plates 14 and 16 are connected together by a transverse filler bar or end plate 22. The filler bar 22 extends the full width of the bottom plate 14 and has the dual function which will be described in more detail hereinafter.

At the left end of the housing 12, the plates 14 and 16 are provided with enlargements 24 and 26, respectively. These enlargements 24 and 26 project forwardly from the main portions of the plate 14 and 16 and are of the same size. The enlargements 24 and 26 form parts of the housing for drive mechanism for the mower assembly 10. The left edges of the enlargements 24 and 26 are connected together by a filler bar 28 which extends transversely of the housing 12. The enlargements 24 and 26 are connected to the filler bar 28 by means of suitable fasteners 30 which pass through the enlargements 24 and 26 as well as the filler bar 28.

Referring now to FIGURE 5 in particular, it will be seen that the lower plate 14 functions as a guide. The upper plate 16 does not function as a guide, but has secured to the underside thereof a filler plate 32 which cooperates with the lower plate 14 to also function as a guide. The filler plate 32 is secured to the upper plate 16 by means of a plurality of fasteners 34. The right end of the filler plate 30, as viewed in FIGURE 1, also engages the bar 22, which functions as a stop and means for positioning the filler plate 32.

The housing 12, including the filler plate 32, defines an L-shaped cross-sectional recess 36 which opens through the forward edge of the housing 12 as at 38. Seated in this L-shaped cross-sectional recess 36 are body portions of a pair of blades 40 and 42.

The blade 42 includes a body portion 44 which has projecting therefrom a plurality of teeth 46. The body portion 44 terminates at its rear edge in an upwardly directed rear flange 48.

The blade 40 is very similar to the blade 42 and includes a body portion 50 having formed integral with the forward edge thereof a plurality of projecting teeth 52. The body portion 50 also terminates at its rear edge in an upwardly directed rear flange 54. However, the body portion of the blade 40 is not as wide as the body portion of the blade 42 so that the rear flange 54 of the blade 40 is disposed forwardly of the rear flange 48 of the blade 42. The rear flanges 48 and 54 are, however, in face to face engagement so that the blades 40 and 42 are disposed in internested relation. Furthermore, the body portions 44 and 50 and the rear flanges 48 and 54 of the blades 42 and 40, respectively, are disposed in guided relation within the L-shaped cross-sectional recess 36 for reciprocatory movement.

Referring now the FIGURE 3 in particular, it will be seen that the enlargement 24 has secured to the underside thereof a bearing assembly which is referred to in general by the reference numeral 56. The bearing assembly 56 includes a bearing holder 58 which is secured to the enlargement 24 by means of suitable fasteners 60. Seated in the bearing holder 58 is a bearing 62.

Carried by the enlargement 26 is a bearing assembly which is referred to in general by the reference numeral 64. The bearing assembly 64 is identical with the bearing assembly 56 and includes a bearing holder 66 which is secured to the enlargement 26 by means of suitable fasteners 68. Carried by the bearing holder 66 is a suitable bearing 70.

At this time it is pointed out that the enlargement 24 has an opening 72 therethrough which is aligned with the bearing 62 and the enlargement 26 has an opening 74 therethrough which is aligned with the bearing 70. The openings 72 and 74 are aligned.

Rotatably journaled in the bearing 62 is a hub 76 of an eccentric 78. A second eccentric 80 has a hub 82 which is rotatably journaled in the bearing 70. Extending through the hubs 76 and 82 and suitably keyed thereto is a drive shaft 84.

Referring now to FIGURE 2 in particular, it will be seen that the teeth 46 of the mower blade 42 are discontinued at the left end thereof to provide a large uninterrupted area 86 which is provided with a longitudinally extending slot 88. Secured to the underside of the mower blade 42 in alignment with the slot 88 is a drive plate 90 which has an elongated transverse slot 92 formed therein.

The mower blade 40 also has the teeth 52 thereof interrupted at the left end to provide a large uninterrupted area 94. The uninterrupted area 94 is provided with a longitudinally elongated slot 96 which corresponds to the slot 88 and which is aligned therewith. Overlying the uninterrupted area 94 in alignment with the slot 96 is a drive plate 98. The drive plate 98 is provided with a transversely elongated slot 100 which corresponds to the slot 92 in the drive plate 90.

As is best illustrated in FIGURE 3, the eccentric 78 is seated in the slot 92 of the drive plate 90. The eccentric 80 is similarly seated in the slot 100 of the drive plate 98. At the same time the shaft 84 passes through the slots 88 and 96. Thus it will be seen that as the shaft 84 is rotated, the blades 40 and 42 will be reciprocated longitudinally of the housing 12. The eccentrics 78 and 80 are carried by the shaft 84 in out of phase relation, as is best shown in FIGURE 3. Thus, the blades 40 and 42 are reciprocated in timed out of phase relation.

In order that the blades 40 and 42 may be driven, the shaft 84 is provided with a drive pulley 102. The drive pulley 102 has entrained thereover a drive belt 104 which is connected to a suitable power source (not shown). Incidentally, if other types of drive means for the shaft 84 is desired, they may be substituted for the drive pulley 102 and the drive belt 104.

From the foregoing, it will be readily apparent that there has been devised a very simple mower blade assembly for a mower which may be readily fabricated of relatively inexpensive materials with a minimum of machinery and wherein the blades of the mower are so fixed with respect to the housing so that they freely reciprocate within the housing and at the same time are not subject to excessive wear. Furthermore, the construction of the housing 12 is of such a nature whereby it may be readily disassembled for the purpose of inspecting and repairing the mower.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A double sickle mowing assembly including a housing, said housing comprising upper and lower vertically spaced elongated and generally parallel plates, said plates having rear portions, an elongated filler bar disposed between said rear portions of said plates and secured thereto, an elongated filler plate secured to one of said vertically spaced plates between the latter and spaced forwardly of said filler bar and spaced slightly from the other of said plates, said top and bottom plates and said filler bar and plate defining an elongated forwardly opening recess substantially L-shaped in cross-section, a pair of elongated cutting blades substantially L-shaped in cross-section disposed in nested surface to surface sliding contacting relation and in said recess for relative longitudinal sliding movement therein, said blade having coacting forwardly projecting cutting teeth, and means operatively associated with said housing and blades to effect longitudinal reciprocation of said blades relative to each other.

2. The combination of claim 1 wherein said elongated filler bar is removably secured between said plates.

3. The combination of claim 2 wherein said filler plate is removably secured to said one vertically spaced plate.

References Cited in the file of this patent

UNITED STATES PATENTS

| | | |
|---|---|---|
| 215,017 | Moore | May 6, 1879 |
| 2,146,399 | Landrey | Feb. 7, 1939 |
| 2,738,639 | Stearman et al. | Mar. 20, 1956 |
| 2,782,586 | Specht | Feb. 26, 1957 |